US010446159B2

(12) United States Patent
Kawashima et al.

(10) Patent No.: US 10,446,159 B2
(45) Date of Patent: *Oct. 15, 2019

(54) SPEECH/AUDIO ENCODING APPARATUS AND METHOD THEREOF

(71) Applicant: PANASONIC INTELLECTUAL PROPERTY CORPORATION OF AMERICA, Torrance, CA (US)

(72) Inventors: Takuya Kawashima, Ishikawa (JP); Masahiro Oshikiri, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,184

(22) Filed: Nov. 22, 2016

(65) Prior Publication Data

US 2017/0076728 A1 Mar. 16, 2017

Related U.S. Application Data

(63) Continuation of application No. 14/001,977, filed as application No. PCT/JP2012/001903 on Mar. 19, 2012, now Pat. No. 9,536,534.

(30) Foreign Application Priority Data

Apr. 20, 2011 (JP) ................................ 2011-094446

(51) Int. Cl.
*G10L 19/02* (2013.01)
*G10L 19/06* (2013.01)
(Continued)

(52) U.S. Cl.
CPC ........ *G10L 19/002* (2013.01); *G10L 19/0208* (2013.01); *G10L 19/035* (2013.01); *G10L 19/06* (2013.01); *G10L 19/12* (2013.01)

(58) Field of Classification Search
CPC ...... G10L 19/12; G10L 19/0208; G10L 19/06
See application file for complete search history.

(56) References Cited

U.S. PATENT DOCUMENTS 5,581,653 A * 12/1996 Todd .................... G10L 19/035 704/206
5,717,821 A 2/1998 Tsutsui et al.
(Continued)

FOREIGN PATENT DOCUMENTS

JP 63-037400 2/1988
JP 09-106299 4/1997
(Continued)

OTHER PUBLICATIONS

R. Lefebvre et al., "High Quality Coding of Wideband Audio Signals Using Transform Coded Excitation (TCX)", Proc. ICASSP 1994, pp. I-193 to I-196, 1994.
(Continued)

*Primary Examiner* — Bryan S Blankenagel
(74) *Attorney, Agent, or Firm* — Greenblum & Bernstein, P.L.C.

(57) ABSTRACT

A speech/audio encoding device for selectively allocating bits for higher precision encoding. The speech/audio encoding device receives a time-domain speech/audio input signal, transforms the speech/audio input signal into a frequency domain, and quantizes an energy envelope corresponding to an energy level for a frequency spectrum of the speech/audio input signal. The speech/audio encoding device further groups quantized energy envelopes into a plurality of groups, determines a perceptual significant group including one or more significant bands and a local-peak frequency, and allocates bits to a plurality of subbands corresponding to the grouped quantized energy envelopes, in which each of the subbands is obtained by splitting the frequency spectrum of the speech/audio input signal. The
(Continued)

speech/audio encoding device encodes the frequency spectrum using the bits allocated to the subbands.

6 Claims, 11 Drawing Sheets

(51) Int. Cl.
*G10L 19/002* (2013.01)
*G10L 19/12* (2013.01)
*G10L 19/035* (2013.01)

(56) References Cited

U.S. PATENT DOCUMENTS

| | | | | |
|---|---|---|---|---|
| 5,819,212 | A | 10/1998 | Matsumoto et al. | |
| 5,983,172 | A | 11/1999 | Takashima et al. | |
| 6,064,954 | A * | 5/2000 | Cohen | G10L 19/0212 704/207 |
| 6,658,382 | B1 | 12/2003 | Iwakami et al. | |
| 6,826,526 | B1 | 11/2004 | Norimatsu et al. | |
| 6,871,106 | B1 | 3/2005 | Ishikawa et al. | |
| 6,904,404 | B1 | 6/2005 | Norimatsu et al. | |
| 6,996,523 | B1 | 2/2006 | Bhaskar et al. | |
| 7,299,189 | B1 * | 11/2007 | Sato | G10L 19/018 704/500 |
| 7,751,485 | B2 * | 7/2010 | Pang | G10L 19/00 348/375 |
| 8,150,684 | B2 | 4/2012 | Kawashima et al. | |
| 8,160,868 | B2 | 4/2012 | Kawashima et al. | |
| 8,370,138 | B2 | 2/2013 | Kawashima et al. | |
| 2003/0055656 | A1 | 3/2003 | Tasaki | |
| 2003/0142746 | A1 * | 7/2003 | Tanaka | H04N 19/63 375/240.11 |
| 2004/0078194 | A1 | 4/2004 | Liljeryd et al. | |
| 2004/0250287 | A1 | 12/2004 | Haneda | |
| 2005/0187762 | A1 * | 8/2005 | Tanaka | G10L 19/26 704/220 |
| 2005/0261893 | A1 | 11/2005 | Toyama | |
| 2007/0016404 | A1 * | 1/2007 | Kim | G10L 19/02 704/200.1 |
| 2007/0016418 | A1 | 1/2007 | Mehrotra et al. | |
| 2007/0136049 | A1 | 6/2007 | Tasaki | |
| 2007/0225971 | A1 | 9/2007 | Bessette | |
| 2007/0258518 | A1 * | 11/2007 | Tu | H04N 19/176 375/240.03 |
| 2007/0282602 | A1 | 12/2007 | Fujishima | |
| 2007/0282603 | A1 | 12/2007 | Bessette | |
| 2008/0052084 | A1 | 2/2008 | Tasaki | |
| 2008/0052085 | A1 | 2/2008 | Tasaki | |
| 2008/0052086 | A1 | 2/2008 | Tasaki | |
| 2008/0052087 | A1 | 2/2008 | Tasaki | |
| 2008/0052088 | A1 | 2/2008 | Tasaki | |
| 2008/0071551 | A1 | 3/2008 | Tasaki | |
| 2008/0071552 | A1 | 3/2008 | Tasaki | |
| 2008/0126082 | A1 | 5/2008 | Ehara | |
| 2008/0279257 | A1 * | 11/2008 | Vujcic | H04B 7/2637 375/132 |
| 2008/0281603 | A1 | 11/2008 | Tasaki | |
| 2009/0192789 | A1 | 7/2009 | Lee | |
| 2009/0271204 | A1 | 10/2009 | Tammi | |
| 2009/0281811 | A1 | 11/2009 | Oshikiri | |
| 2009/0326930 | A1 | 12/2009 | Kawashima et al. | |
| 2009/0326931 | A1 | 12/2009 | Ragot | |
| 2010/0017197 | A1 | 1/2010 | Oshikiri | |
| 2010/0049509 | A1 | 2/2010 | Kawashima et al. | |
| 2010/0121646 | A1 * | 5/2010 | Ragot | G10L 19/0204 704/500 |
| 2010/0153099 | A1 | 6/2010 | Goto | |
| 2010/0169081 | A1 | 7/2010 | Yamanashi et al. | |
| 2010/0217608 | A1 | 8/2010 | Tasaki | |
| 2010/0274555 | A1 * | 10/2010 | Laaksonen | G10L 19/0208 704/201 |
| 2010/0286990 | A1 | 11/2010 | Biswas et al. | |
| 2011/0046946 | A1 | 2/2011 | Liu et al. | |
| 2012/0065965 | A1 * | 3/2012 | Choo | G10L 21/038 704/203 |
| 2012/0146831 | A1 * | 6/2012 | Eksler | G10L 19/038 341/200 |

FOREIGN PATENT DOCUMENTS

| | | |
|---|---|---|
| JP | 2000-338998 | 12/2000 |
| JP | 2002-033667 | 1/2002 |
| JP | 2003-076397 | 3/2003 |
| JP | 2007-525707 | 9/2007 |
| JP | 2009-501943 | 1/2009 |

OTHER PUBLICATIONS

International Search Report dated Jun. 12, 2012.

* cited by examiner

SPEECH/AUDIO ENCODING APPARATUS AND METHOD THEREOF

CROSS REFERENCE TO RELATED APPLICATIONS

This is a continuation application of U.S. patent application Ser. No. 14/001,977, filed Aug. 28, 2013, which is a U.S. National Stage of International Application No. PCT/JP2012/001903, filed on Mar. 19, 2012, which claims the benefit of Japanese Patent Application No. 2011-094446, filed on Apr. 20, 2011. The entire disclosure of each of the above-identified applications, including the specification, drawings, and claims, is incorporated herein by reference in its entirety.

TECHNICAL FIELD

The present invention relates to a speech/audio encoding apparatus configured to encode a speech signal and/or an audio signal, a speech/audio decoding apparatus configured to decode a encoded signal, and a method for encoding and decoding a speech signal and/or an audio signal.

BACKGROUND ART

CELP (Code Excited Linear Prediction) is known as a method for high-quality compression of a speech with a low bit rate. However, although CELP can encode a speech signal with high efficiency, it has a problem of a loss of sound quality with respect to a music signal. To solve this problem, TCX (Transform Coded eXcitation), which converts to the frequency domain and encodes an LPC residual signal generated by an LPC (Linear Predication Coefficient) inverse filter has been proposed (for example in Non-Patent Literature (hereinafter, referred to as "NPL") 1). With TCX, because conversion coefficients converted to the frequency domain are directly quantized, detailed representation of a spectrum is possible, and it is possible to achieve high sound quality in a music signal. Therefore, when encoding a music signal, the approach of encoding in the frequency domain, such as in TCX, has become the most popular method. Hereinafter, the signal that is the subject of encoding in the frequency domain is referred to as target signal.

NPL 1 discusses encoding of a wideband signal by TCX, in which an input signal is fed into an LPC inverse filter to obtain an LPC residual signal that, after removing long term correlation components from the LPC residual signal, is fed into a weighted synthesis filter. The signal that has been fed into the weighted synthesis filter is converted to the frequency domain so as to obtain an LPC residual spectrum signal. The LPC residual spectrum signal that is obtained is encoded in the frequency domain. In the case of a music signal, because of a fact that the temporal correlation tends to be high in a high frequency band, a method is adopted that encodes spectrum difference from the previous frame by a vector quantization all at one time.

Also, in Patent Literature (hereinafter, referred to as "PTL") 1, there is a proposed method, based on a combination of ACELP and TCX, for low-frequency emphasis and encoding with respect to an LPC residual spectrum signal obtained in the same manner as in PTL 1. The target vector is split into subbands of eight samples each, with the spectral shape and gain encoded by subbands. Although many bits are allocated for the gain in the subband having the largest energy, the overall sound quality is improved by assuring that the bits allocated to low-band ends lower than the largest band are not insufficient. The spectral shape is encoded by lattice vector quantization.

In NPL 1, the correlation of the previous frame with respect to the target signal is used to compress the amount of data and bits are allocated in the order of decreasing amplitude. In PTL 1, subbands are defined in each every eight samples, and while care is taken that the low-band end is particularly allocated a sufficient number of bits, a large number of bits are allocated to subbands having a large amount of energy.

CITATION LIST

Patent Literature

PTL 1

Japanese Unexamined Patent Application Publication (Translation of PCT Application) No. 2007-525707

Non-Patent Literature

NPL 1

R. Lefebvre, R. Salami, C. Laflamme, J. P. Adoul, "High quality coding of wideband audio signals using transform coded excitation (TCX)", Proc. ICASSP 1994, pp. 1-193 to 1-196, 1994.

SUMMARY OF INVENTION

Technical Problem

However, in the related art's method, because only the target signal is considered and the amplitudes of frequencies having a large amplitude are encoded with high accuracy, if the decoded signal is considered, there is a problem that the encoding accuracy of an audibly significant frequency domain region is not necessarily improved. There is also a problem that additional information indicating how many bits have been allocated to particular frequency domain regions is required.

An object of the present invention is to provide a speech/audio encoding apparatus and a speech/audio decoding apparatus that encode with high accuracy the significant frequency domain regions without influence of audibly non-significant frequency domain regions and achieve high sound quality by identifing audibly significant frequency domain regions freely and independently of subbands, which are the unit of encoding, and by repositioning the spectrum (or conversion coefficients) included in the significant frequency domain regions.

Solution to Problem

A speech/audio encoding apparatus according to an aspect of the present invention is an apparatus configured to encode a linear prediction coefficient, the apparatus including: an identification section that identifies one or more audibly significant frequency domain regions using the linear prediction coefficient; a repositioning section that repositions the identified significant frequency domain region; and a determination section that determines bit allocation for encoding, based on the repositioned significant frequency domain region.

A speech/audio decoding apparatus according to an aspect of the present invention is an apparatus including: an acquisition section that acquires encoded linear prediction coefficient data while the linear prediction coefficient has been used to identify one or more audibly significant frequency domain regions before repositioning said audibly significant frequency domain regions and determining bit allocation for encoding based on said repositioned audibly significant frequency domain regions; an identification section that identifies the significant frequency domain region using the linear prediction coefficient obtained by decoding the acquired linear prediction coefficient encoded data; and a repositioning section that returns the identified significant frequency domain region to the original position before the repositioning is performed.

A speech/audio encoding method according to an aspect of the present invention is a method in a speech/audio encoding apparatus configured to encode a linear prediction coefficient, the method including: identifying an audibly significant frequency domain region using the linear prediction coefficient; repositioning the identified significant frequency domain region; and determining bit allocation for encoding based on the repositioned significant frequency domain region.

A speech/audio decoding method according to an aspect of the present invention is a method including: acquiring encoded linear prediction coefficient data while the linear prediction coefficient has been used to identify one or more audibly significant frequency domain regions before repositioning said audibly significant frequency domain regions and determining bit allocation for encoding based on said repositioned audibly significant frequency domain regions; identifying the significant frequency domain region using the linear prediction coefficient obtained by decoding the acquired linear prediction coefficient encoded data; and returning the identified significant frequency domain region to the original position before the repositioning is performed.

Advantageous Effects of Invention

According to the present invention, it is possible to encode a significant frequency domain region with high accuracy and achieve high sound quality.

DESCRIPTION OF EMBODIMENTS

The present invention freely identifies an audibly significant frequency domain region independently of subbands, which are the unit of encoding using quantized linear prediction coefficients which can be referenced by both a speech/audio encoding apparatus and a speech/audio decoding apparatus and repositions the spectrum (or conversion coefficients) included in the significant frequency domain region. Doing this enables determination of bit allocation without the influence of a frequency domain region that is not audibly significant. Doing this also enables encoding of shape and gains of the spectrum (or conversion coefficients) included in the audibly significant frequency domain region. That is, the present invention enables encoding of a significant frequency domain region with high accuracy, and also enables high sound quality.

To be specific, by identifying significant frequency domain regions from linear prediction coefficients, which are components of data to be encoded, and determining the bit allocation after grouping together the significant frequency domain regions, appropriate bit allocation, such as allocating many bits to frequencies that are audibly significant, is made possible. Additionally, in contrast to conventional art in which the widths of, or bit allocation for, subbands which are the processing units for encoding are fixed beforehand, by freely identifying an audibly significant frequency domain region independently from the subbands which are the processing units for encoding and by encoding with a high bit rate after grouping the spectra (or conversion coefficients) included in the identified frequency domain regions, it is made possible to encode audibly significant frequency domain regions with high-accuracy and achieve high sound quality. Additionally, because the significant frequency domain regions can be identified and bit allocation can be computed using linear prediction coefficients, bit allocation information is not necessary and it can be used for the encoding the target signal, thereby subjective quality improvement of the decoded signal can be achieved.

The speech/audio encoding apparatus and speech/audio decoding apparatus of the present invention can be applied to each of a base station apparatus and a terminal apparatus.

Embodiments of the present invention will be described in detail below, with reference to the accompanying drawings. The input signal to the speech/audio encoding apparatus and the output signal of the speech/audio decoding apparatus of the present invention may be any one of a speech signal, a music signal, and a signal that is a mixture of these signals.

Embodiment 1

<Configuration of Speech/Audio Encoding Apparatus>

Figure 1:
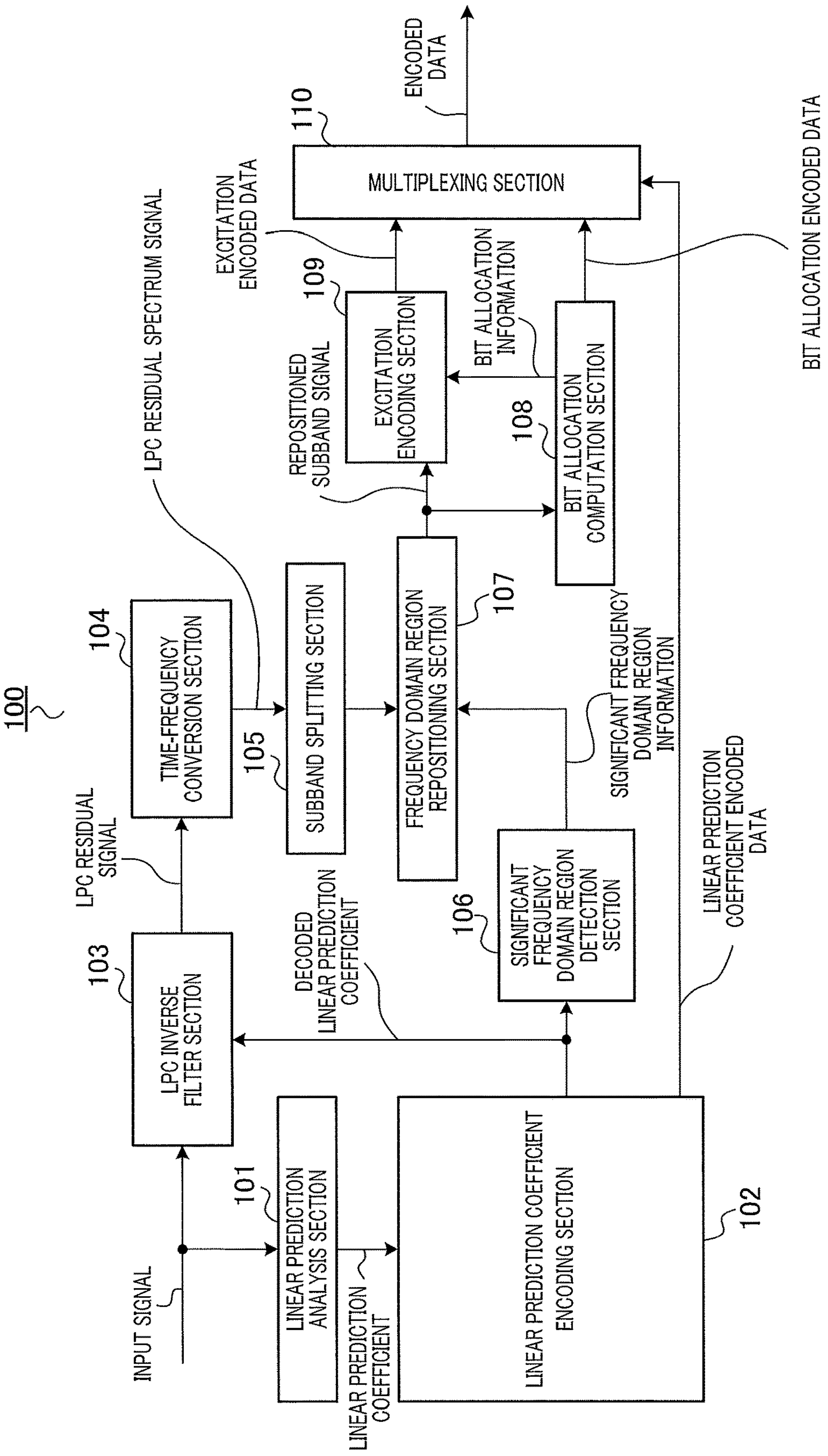
FIG. 1 is a block diagram showing the configuration of a speech/audio encoding apparatus according to Embodiment 1 of the present invention.

FIG. 1 is a block diagram showing the configuration of speech/audio encoding apparatus 100 according to Embodiment 1 of the present invention.

As shown in FIG. 1, speech/audio encoding apparatus 100 includes linear prediction analysis section 101, linear prediction coefficient encoding section 102, LPC inverse filter section 103, time-frequency conversion section 104, subband splitting section 105, significant frequency domain region detection section 106, frequency domain region repositioning section 107, bit allocation computation section 108, excitation encoding section 109, and multiplexing section 110.

Linear prediction analysis section 101 receives an input signal as input, performs linear prediction analysis, and calculates linear prediction coefficients. Linear prediction coefficient analysis section 101 outputs linear prediction coefficients to linear prediction coefficient encoding section 102.

Linear prediction coefficient encoding section 102 receives the linear prediction coefficients outputted from linear prediction analysis section 101, and outputs linear prediction coefficient encoded data to multiplexing section 110. Linear prediction coefficient encoding section 102 outputs to LPC inverse filter section 103 and significant frequency domain region detection section 106 the decoded linear prediction coefficients obtained by decoding the linear prediction coefficient encoded data. In general, the linear prediction coefficient is not encoded as is, but is rather encoded after being converted to parameters such as reflection coefficients or PARCOR, LSP, or ISP parameters.

LPC inverse filter section 103 receives as input the input signal and the decoded linear prediction coefficients outputted from linear prediction coefficient encoding section 102, and outputs an LPC residual signal to time-frequency conversion section 104. LPC inverse filter section 103 forms an LPC inverse filter by the received decoded linear prediction coefficients, and by feeding the received signal into the LPC inverse filter, removes the spectrum envelope of the received signal, so as to obtain the LPC residual signal whose frequency characteristics is flat.

Time-frequency conversion section 104 receives as input the LPC residual signal outputted from LPC inverse filter section 103, and outputs to the subband splitting section 105 the LPC residual spectrum signal obtained by conversion to the frequency domain. DFT (discrete Fourier transform), FFT (fast Fourier transform), DCT (discrete cosine transform), or MDCT (modified discrete cosine transform) or the like is used as the method for conversion to the frequency domain.

Subband splitting section 105 receives as input the LPC residual spectrum signal outputted from time-frequency conversion section 104, splits the residual spectrum signal into subbands, and outputs them to frequency domain region repositioning section 107. Although the subband bandwidth is generally narrower on the low-band end and made wider on the high-band end, because this depends also on the encoding scheme used in the excitation encoding section, there are cases in which splitting is done into subbands which all have widths of the same length. In this case, with the subbands split successively from the low-band end, the subband width becomes long toward the high-band end.

Significant frequency domain region detection section 106 receives as input the decoded linear prediction coefficients outputted from linear prediction coefficient encoding section 102, calculates significant frequency domain regions therefrom, and outputs this information as significant frequency domain region information to frequency domain region repositioning section 107. Details will be described later.

Frequency domain region repositioning section 107 receives as input the LPC residual spectrum signal being split into subbands that is outputted from subband splitting section 105, and the significant frequency domain region information outputted from significant frequency domain region detection section 106. Frequency domain region repositioning section 107, based on the significant frequency domain region information, rearranges the LPC residual spectrum signal that was split into subbands, and outputs the signals as the repositioned subband signals to bit allocation computation section 108 and excitation encoding section 109. Details will be described later.

Bit allocation computation section 108 receives as input the repositioned subband signals outputted from frequency domain region repositioning section 107, and computes the number of encoding bits to be allocated to each subband. Bit allocation computation section 108 outputs the computed number of encoding bits as bit allocation information to excitation encoding section 109, encodes the bit allocation information for transmission to the decoding apparatus, and outputs this to multiplexing section 110 as bit allocation encoded data. Specifically, bit allocation computation section 108 computes the amount of energy for each frequency in each subband of the repositioned subband signals, and allocates bits by the logarithmic energy ratio of each subband.

Excitation encoding section 109 receives as input the repositioned subband signals outputted from frequency domain region repositioning section 107 and the bit allocation information outputted from bit allocation computation section 108, uses the number of encoding bits allocated for each subband to encode the repositioned subband signals, and outputs them to multiplexing section 110 as excitation encoded data. The encoding is done by encoding the spectral shape and gain using vector quantization, AVQ (algebraic vector quantization), or FPC (factorial pulse coding), or the like. In general, since the frequencies with large amplitude are chosen to be encoded, if the number of available bits for encoding becomes larger, the number of frequencies being encoded increases and gain accuracy is improved.

Multiplexing section 110 receives as input the linear prediction coefficient encoded data outputted from linear prediction coefficient encoding section 102, the excitation encoded data outputted from excitation encoding section 109, and the bit allocation encoded data outputted from bit allocation computation section 108, and multiplexes these data and outputs them as an encoded data.

<Processing in Significant Frequency Domain Region Detection Section>

The object of significant frequency domain region detection section 106 is detecting audibly significant frequency domain regions in the input signal. Speech encoding method that encodes LPCs generally allows significant frequency domain regions to be calculated using the LPCs. Thus, in the present invention, the method of calculating significant frequency domain regions using only linear prediction coefficients will be described. If the decoded linear prediction coefficients obtained by decoding the encoded linear prediction coefficients are used, the significant frequency domain regions calculated by the encoding apparatus can be obtained by the decoding apparatus in the same manner.

First, the LPC envelope is obtained using the linear prediction coefficients. The LPC envelope approximately represents the spectrum envelope of the input signal and the frequency domain regions which have sharp peak are audibly extremely significant. Such peaks can be obtained as follows. The moving average of the LPC envelope is calculated in the frequency axis direction, and a moving average line is obtained by adding an offset for the purpose of adjustment. Extraction of significant frequency domain regions can be done by detecting frequency domain regions which has such peaks in which the LPC envelope exceeds the moving average line which have been obtained in above mentioned manner.

Figure 2:
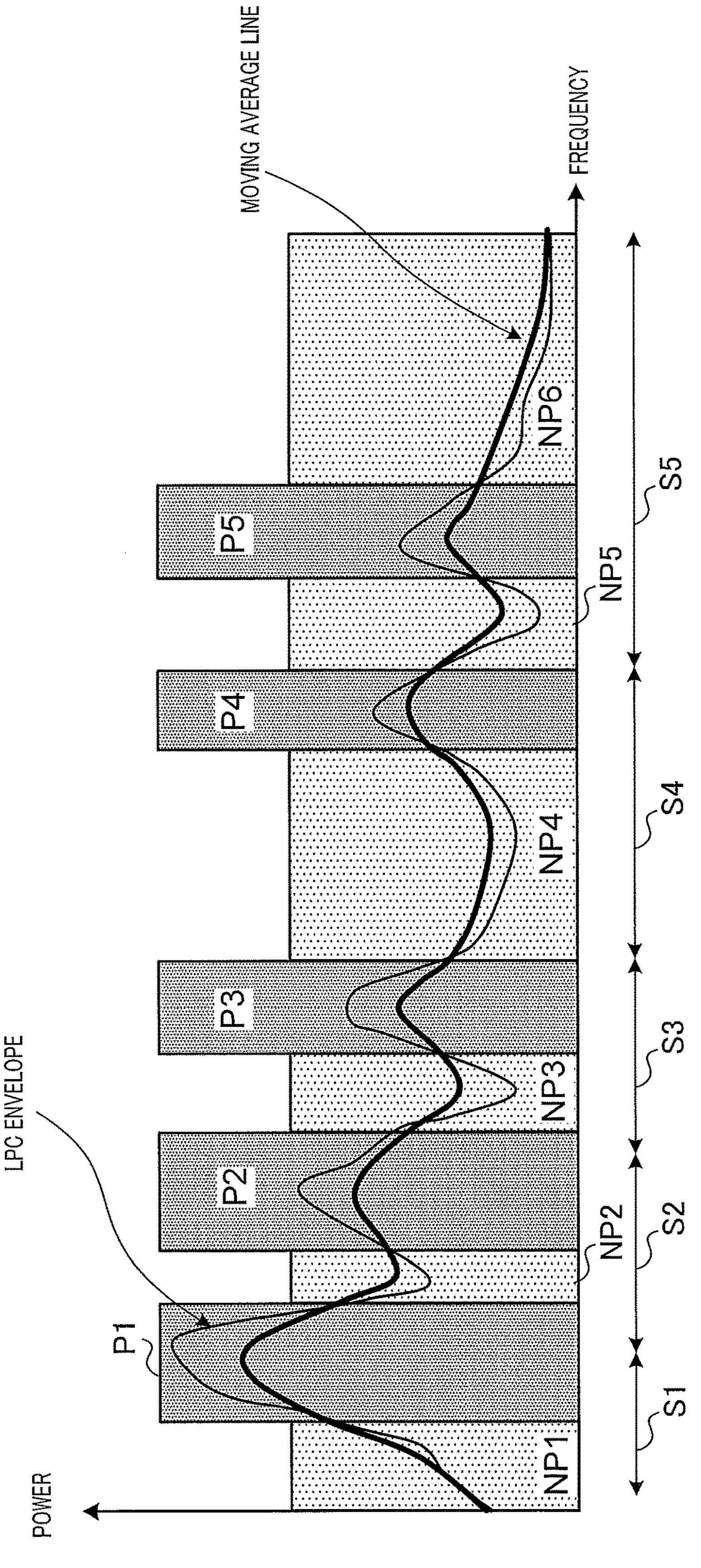
FIG. 2 is a drawing showing the extraction of significant frequency domain regions in Embodiment 1 of the present invention.

FIG. 2 is a drawing showing the extraction of significant frequency domain regions. In FIG. 2, the horizontal axis represents frequency, and the vertical axis represents spectral power. The thin solid line shows the LPC envelope, and the bold solid line shows the moving average line. FIG. 2 shows that, in the regions P1 to P5, the LPC envelope exceeds the moving average line, these regions being detected as significant frequency domain regions. The regions except the significant frequency domain regions are represented, from the lowest frequency domain region upward, as NP1 to NP6. The residual spectrum signal is taken to be split by the subband splitting section 105 into the subbands S1 to S5 from the low-band end and, in this example, the lower the frequency is, the narrower the width is.

<Processing in Frequency Domain Region Repositioning Section>

If significant frequency domain regions are detected by significant frequency domain region detection section 106, the frequency domain regions that are taken to be significant frequency domain regions are positioned adjacently from the low-band end, then, frequency domain regions that were not judged significant frequency domain regions by significant frequency domain region detection section 106 are positioned adjacently from the low-band end.

Figure 3:
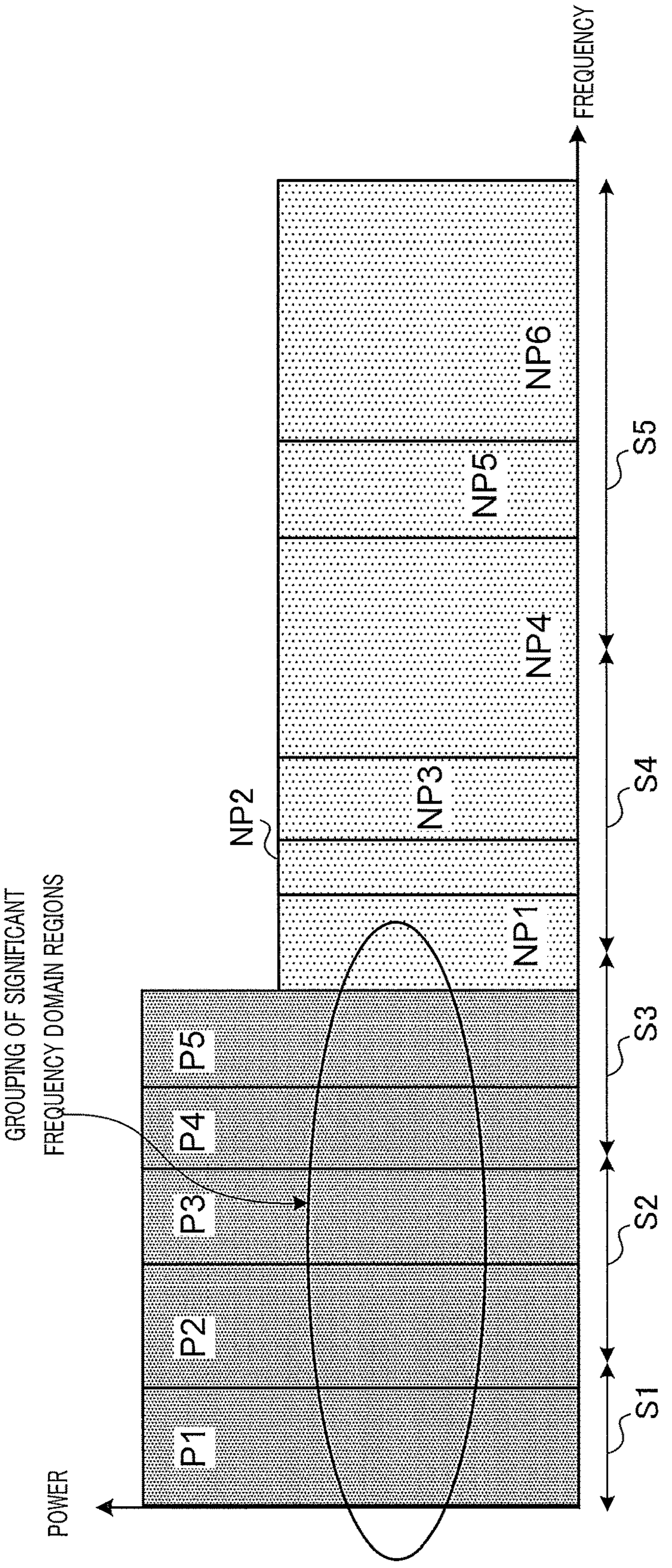
FIG. 3 is a drawing showing repositioning of significant frequency domain regions in Embodiment 1 of the present invention.

The above-noted processing will be described using FIG. 2 and FIG. 3. FIG. 3 shows the repositioning of the significant frequency domain regions. In FIG. 3, the horizontal axis represents frequency and the vertical axis represents spectral power, this showing the repositioning by frequency domain region repositioning section 107.

If significant frequency domain region detection section 106 has detected, as shown in FIG. 2, the significant frequency domain regions from P1 to P5, the significant frequency domain regions are repositioned in the sequence of P1 to P5 from the low-band end. When the repositioning of the detected significant frequency domain regions is completed, frequency domain regions that were not judged to be significant frequency domain regions are repositioned in the region to the high-band end, from NP1 to NP6, starting from the low-band end. In this case, the significant frequency domain regions, as shown in FIG. 2, are the frequency domain regions P1 to P5, in which the spectral power of the LPC envelope is greater than the spectral power of the moving average line (LPC envelope spectral power>moving average line spectral power).

<Processing in Bit Allocation Computation Section>

Let us consider the subband S1 in FIG. 2 as an example. The subband S1 includes a part of the significant frequency domain region P1. If the encoding bits for subband S1 are to be allocated in accordance with the overall energy of the subband, because the energy of frequency domain regions except the significant frequency domain region P1 is not necessarily high, it is not possible to allocate sufficient bits to subband S1.

In contrast, let us consider the bit allocation in a repositioned subband signal in which a significant frequency domain region is repositioned by frequency domain region repositioning section 107. As shown in FIG. 3, because the significant frequency domain regions are grouped together in the low-band end, the subband S1 includes the significant frequency domain region P1 and a part of the significant frequency domain region P2. As is clear from this example, because the subband S1 includes significant frequency domain regions only, it is possible to compute an appropriate bit allocation without the influence of frequency domain regions that are not audibly significant.

<Configuration of Speech/Audio Decoding Apparatus>

Figure 4:
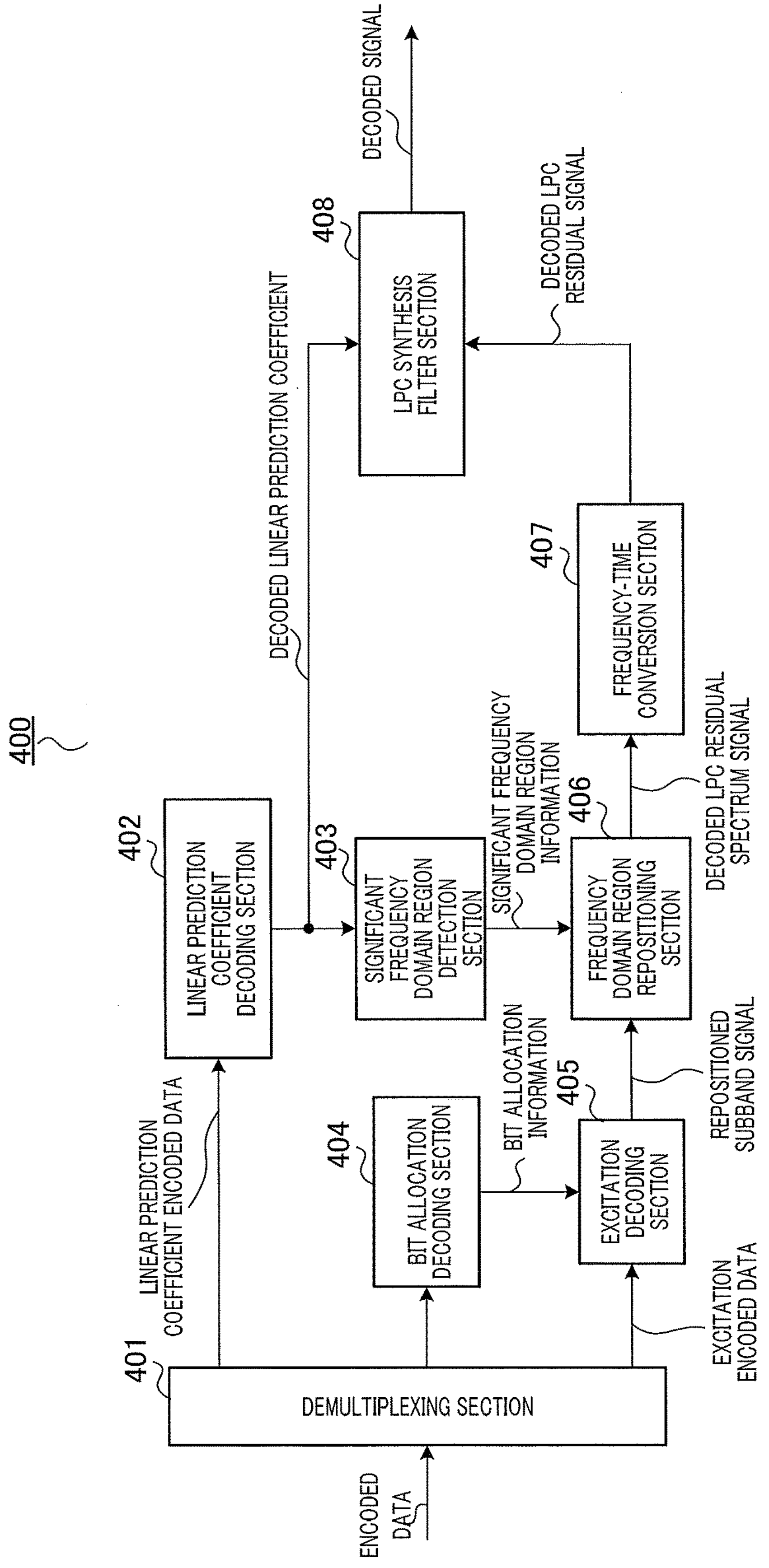
FIG. 4 is a block diagram showing the configuration of a speech/audio decoding apparatus according to Embodiment 1 of the present invention.

FIG. 4 is a block diagram showing the configuration of speech/audio decoding apparatus 400 in Embodiment 1 of the present invention. Speech/audio decoding apparatus 400 includes demultiplexing section 401, linear prediction coefficient decoding section 402, significant frequency domain region detection section 403, bit allocation decoding section 404, excitation decoding section 405, frequency domain region repositioning section 406, frequency-time conversion section 407, and LPC synthesis filter section 408.

Demultiplexing section 401 receives encoded data from speech/audio encoding apparatus 100, outputs linear prediction coefficient encoded data to linear prediction coefficient decoding section 402, outputs bit allocation encoded data to bit allocation decoding section 404, and outputs excitation encoded data to excitation decoding section 405.

Linear prediction coefficient decoding section 402 receives as input the linear prediction coefficient encoded data outputted from demultiplexing section 401 and outputs the linear prediction coefficients obtained by decoding the linear prediction coefficient encoded data to significant frequency domain region detection section 403 and LPC synthesis filter section 408.

Significant frequency domain region detection section 403 is the same as significant frequency domain region detection section 106 of speech/audio encoding apparatus 100. Because the decoded linear prediction coefficients received by significant frequency domain region detection section 403 are the same as input received by significant frequency domain region detection section 106, the significant frequency domain region information obtained therefrom is also the same as from significant frequency domain region detection section 106.

Bit allocation decoding section 404 receives as input the bit allocation encoded data outputted from demultiplexing section 401, and outputs to the excitation decoding section 405 the bit allocation information obtained by decoding the bit allocation encoded data. The bit allocation information is information that indicates the number of bits that were used in encoding each individual subband.

Excitation decoding section 405 receives as input the excitation encoded data outputted from demultiplexing section 401 and the bit allocation information outputted from bit allocation decoding section 404, defines the number of encoded bits for each subband in accordance with the bit allocation information, decodes the excitation encoded data for each subband using the information, and obtains the repositioned subband signals. Excitation decoding section 405 outputs the obtained repositioned subband signals to frequency domain region repositioning section 406.

Frequency domain region repositioning section 406 receives as input the repositioned subband signals outputted from excitation decoding section 405 and the significant frequency domain region information outputted from significant frequency domain region detection section 403, and performs processing to return the signal of the lowest band of the repositioned subband signals to the detected significant frequency domain region. If there are more significant frequency domain regions on the high-band end, frequency domain region repositioning section 406 performs processing to successively return the repositioned subband signals from the low-band end to the detected significant frequency domain regions. When the processing in the significant frequency domain regions is completed, frequency domain region repositioning section 406 successively moves decoded repositioned subband signals that were not judged to be significant frequency domain regions to frequency domain regions other than the significant frequency domain regions starting from the low-band end. Frequency domain region repositioning section 406, by the above-noted operation, can obtain a decoded spectrum, the obtained decoded spectrum being outputted as the decoded LPC residual spectrum signal to frequency-time conversion section 407.

Frequency-time conversion section 407 receives as input the decoded LPC residual spectrum signal outputted from frequency domain region repositioning section 406 and converts the received decoded LPC residual spectrum signal to a time-domain signal to obtain a decoded LPC residual signal. This processing performs the inverse of the conversion done by time-frequency conversion section 104 of speech/audio encoding apparatus 100. Frequency-time conversion section 407 outputs the obtained decoded LPC residual signal to LPC synthesis filter section 408.

LPC synthesis filter section 408 receives as input the decoded linear prediction coefficients outputted from linear prediction coefficient decoding section 402 and the decoded LPC residual signal outputted from frequency-time conversion section 407, forms an LPC synthesis filter by the decoded linear prediction coefficients, and by inputting the decoded LPC residual signal to the filter, can obtain a decoded signal. LPC synthesis filter section 408 outputs the obtained decoded signal.

By the configuration and the operation of the above-described speech/audio encoding apparatus and speech/audio decoding apparatus, because audibly significant frequency domain regions in the input signal are the focus, it is possible to compute an optimum bit allocation for the significant frequency domain regions without the influence of non-significant frequency domain regions, thereby enabling achievement of better sound quality for a given number of excitation encoding bits.

<Effect of the Present Embodiment>

In this manner, according to the present embodiment, with bit allocation done for only audibly significant frequency domain regions, it is possible to increase the number of bits allocated to individual frequencies within audibly significant frequency domain regions, which in turn makes it possible to encode audibly significant frequency components with high accuracy, enabling a subjective quality improvement.

Also, according to the present embodiment, in contrast to the conventional art, in which the width of, and bit allocation for, a subband, which is the processing unit for encoding, are fixed beforehand, by freely identifying an audibly significant frequency domain region independently from subbands, which are the processing units, and encoding with a high bit rate after grouping the spectra (or conversion coefficients) included in the identified frequency domain regions, high-accuracy encoding of audibly significant frequency domain regions becomes possible, so that high sound quality is achieved.

Additionally, because significant frequency domain regions can be identified and bit allocation can be computed using linear prediction coefficients, bit allocation information is not necessary and it can be used for the encoding of the target signal, thereby subjective quality improvement of the decoded signal can be achieved.

Variation of Embodiment 1

Although, in the foregoing description, the bit allocation is determined from the repositioned subband signals after grouping the significant frequency domain regions, in this case it is necessary to encode the bit allocation information and transmit it at speech/audio decoding apparatus 400. However, because the LPC envelope itself can be regarded as indicating the approximate spectral energy distribution of the input signal, determining the bit allocation from the LPC envelope also seems to be an appropriate bit allocation method. Determining the bit allocation directly from the LPC envelope allows speech/audio encoding apparatus 100 and speech/audio decoding apparatus 400 to share the bit allocation information, without encoding and transmitting the bit allocation information.

Figure 5:
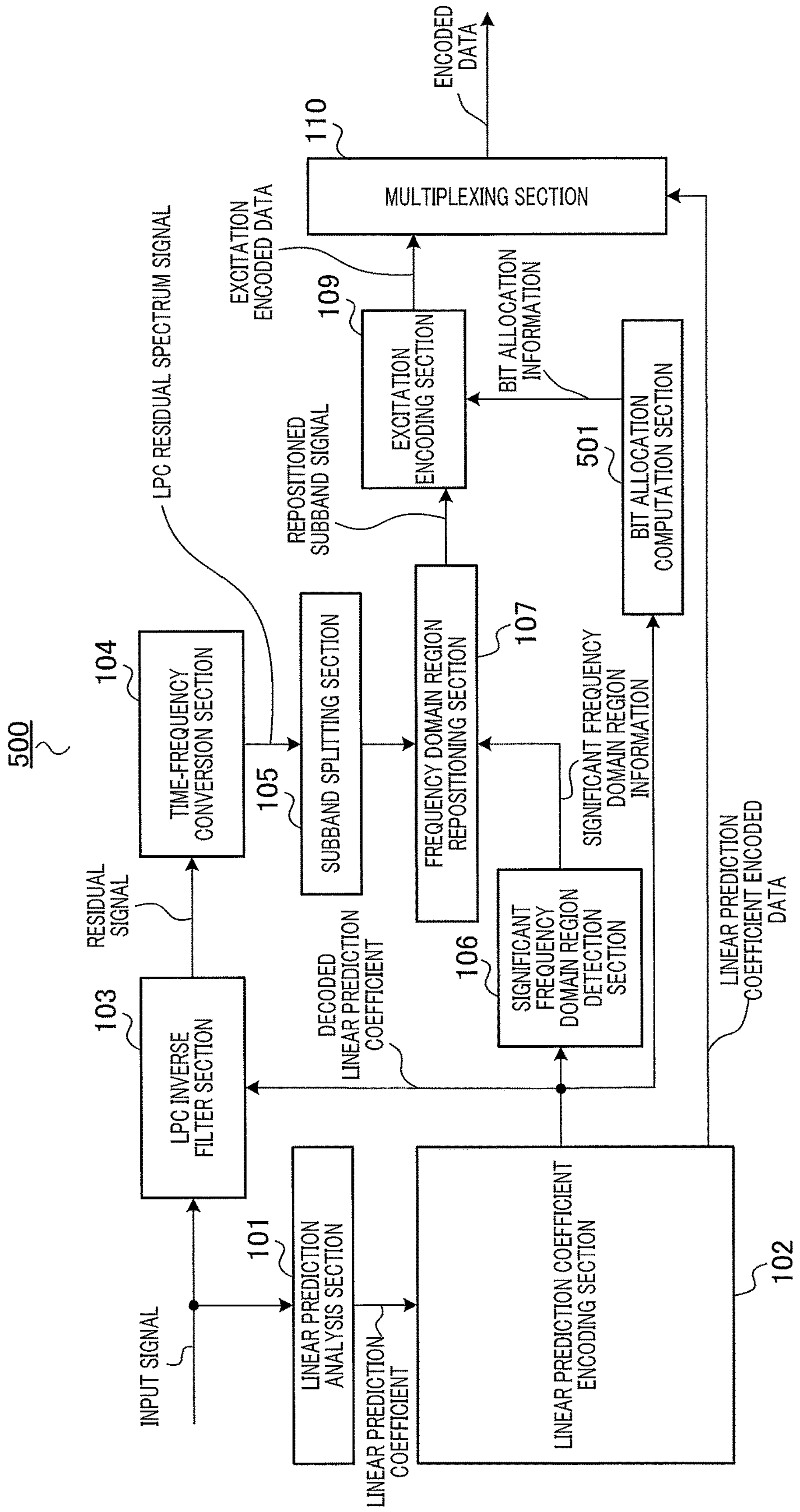
FIG. 5 is a block diagram showing the configuration of a speech/audio encoding apparatus according to a variation of Embodiment 1 of the present invention.

FIG. 5 is a block diagram showing the configuration of speech/audio encoding apparatus 500 according to a variation of the present embodiment.

Speech/audio encoding apparatus 500 shown in FIG. 5, in contrast to speech/audio encoding apparatus 100 shown in FIG. 1, has bit allocation computation section 501 in place of bit allocation computation section 108. In FIG. 5, parts having the same configuration as those in FIG. 1 are assigned the same reference notations, and the descriptions thereof will be omitted.

Linear prediction coefficient encoding section 102 outputs to LPC inverse filter section 103, significant frequency domain region detection section 106, and bit allocation computation section 501 decoded linear prediction coefficients obtained by decoding the linear prediction coefficient encoded data. Because the other configuration of, and processing in linear prediction coefficient encoding section 102 are the same as described above, the descriptions thereof will be omitted.

Bit allocation computation section 501 receives as input decoded linear prediction coefficients outputted from linear prediction coefficient encoding section 102, and computes the bit allocation from the decoded linear prediction coefficients. Bit allocation computation section 501 outputs the computed bit allocation as bit allocation information to excitation encoding section 109.

Excitation encoding section 109 receives as input repositioned subband signals outputted from frequency domain region repositioning section 107 and bit allocation information outputted from bit allocation computation section 501, uses the number of encoding bits allocated to each subband to encode the repositioned subband signals, and outputs these as excitation encoded data to multiplexing section 110.

Multiplexing section 110 receives as input linear prediction coefficient encoded data outputted from linear prediction coefficient encoding section 102 and excitation encoded data outputted from excitation encoding section 109, multiplexes these data, and outputs them as encoded data.

In this manner, in the variation of the present embodiment, the input signal to bit allocation computation section 501 is changed from being the significant frequency domain region information to being the decoded linear prediction coefficients, and bit allocation is computed from the decoded linear prediction coefficients. In this case, although the computed bit allocation information, similar to the case of FIG. 1, is output to excitation encoding section 109, because the bit allocation information need not be transmitted to the speech/audio decoding apparatus, there is no need to encode the bit allocation information.

Figure 6:
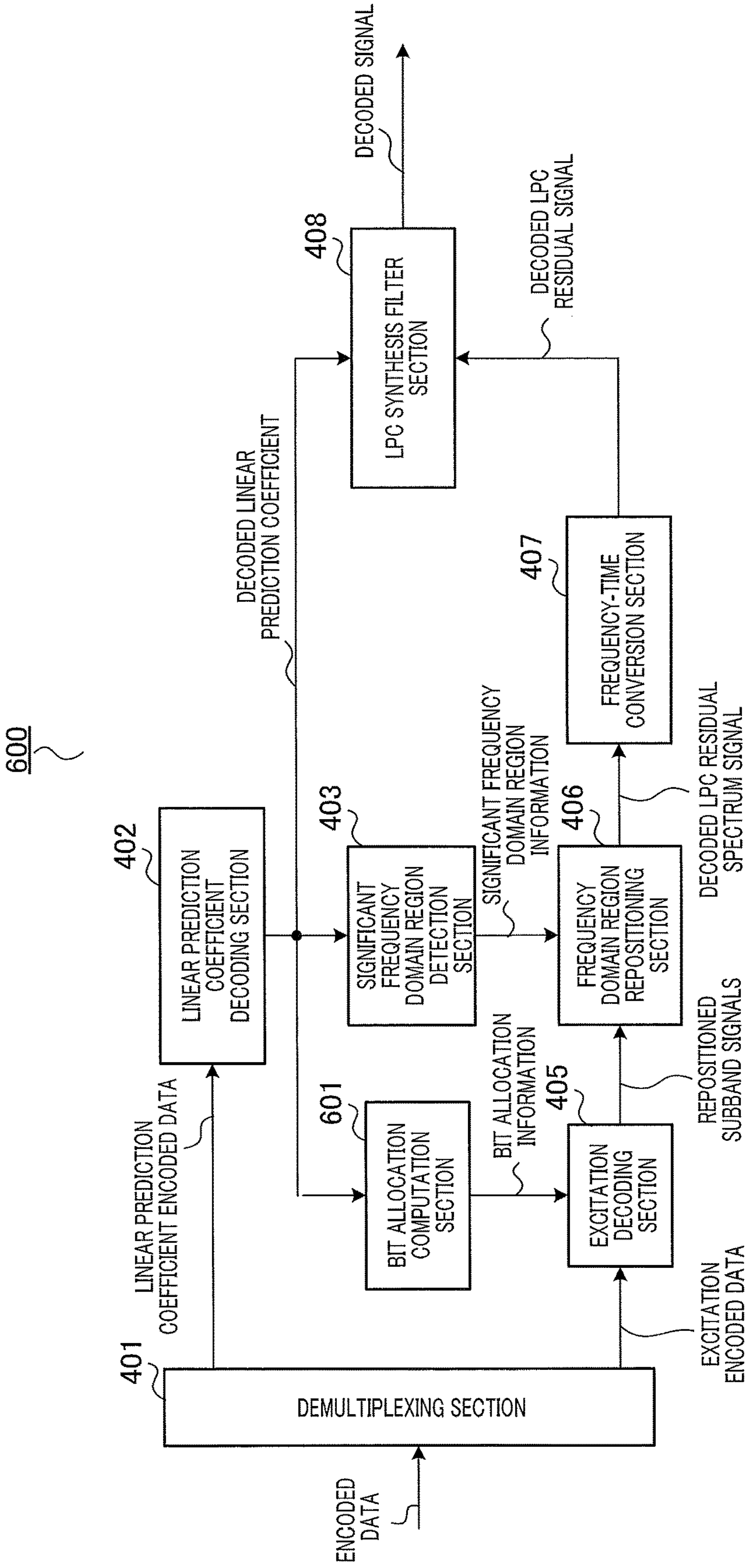
FIG. 6 is a block diagram showing the configuration of a speech/audio decoding apparatus according to a variation of Embodiment 1 of the present invention.

FIG. 6 is a block diagram showing the configuration of speech/audio decoding apparatus 600 in the variation of the present embodiment. In speech/audio decoding apparatus 600 shown in FIG. 6, in comparison with speech/audio decoding apparatus 400 shown in FIG. 4, bit allocation decoding section 404 is eliminated, and bit allocation computation section 601 is added. In FIG. 6, parts having the same configuration as those in FIG. 4 are assigned the same reference notations, and the descriptions thereof will be omitted.

Demultiplexing section 401 receives encoded data from speech/audio encoding apparatus 500, outputs linear prediction coefficient encoded data to linear prediction coefficient decoding section 402 and excitation encoded data to excitation decoding section 405.

Linear prediction coefficient decoding section 402 receives as input the linear prediction coefficient encoded data outputted from demultiplexing section 401, and outputs to significant frequency domain region detection section 403, LPC synthesis filter section 408, and bit allocation computation section 601 decoded linear prediction coefficients obtained by decoding the linear prediction coefficient encoded data.

Bit allocation computation section 601 receives as input the decoded linear prediction coefficients outputted from linear prediction coefficient decoding section 402 and computes the bit allocation from the decoded linear prediction coefficients. Bit allocation computation section 601 outputs the computed bit allocation as bit allocation information to excitation decoding section 405. Because bit allocation computation section 601 uses an input signal that is the same as, and performs the same operation as the bit allocation computation section 501 of speech/audio encoding apparatus 500, it is possible to obtain bit allocation information that is the same as in speech/audio encoding apparatus 500.

Because this configuration eliminates the need to encode and transmit the bit allocation information, the amount of information assigned to bit allocation can be assigned to encoding of the spectral shape and gain of the excitation, thereby enabling encoding with better sound quality.

Embodiment 2

In the present embodiment, the description will be of the case in which the bit allocation for each subband is defined beforehand. In encoding and transmitting the bit allocation information, if the bit rate is not sufficiently high, the bit allocation is defined beforehand. In this case, more bits are allocated in the low-band end, and fewer bits are allocated in the high-band end.

<Configuration of Speech/Audio Encoding Apparatus>

Figure 7:
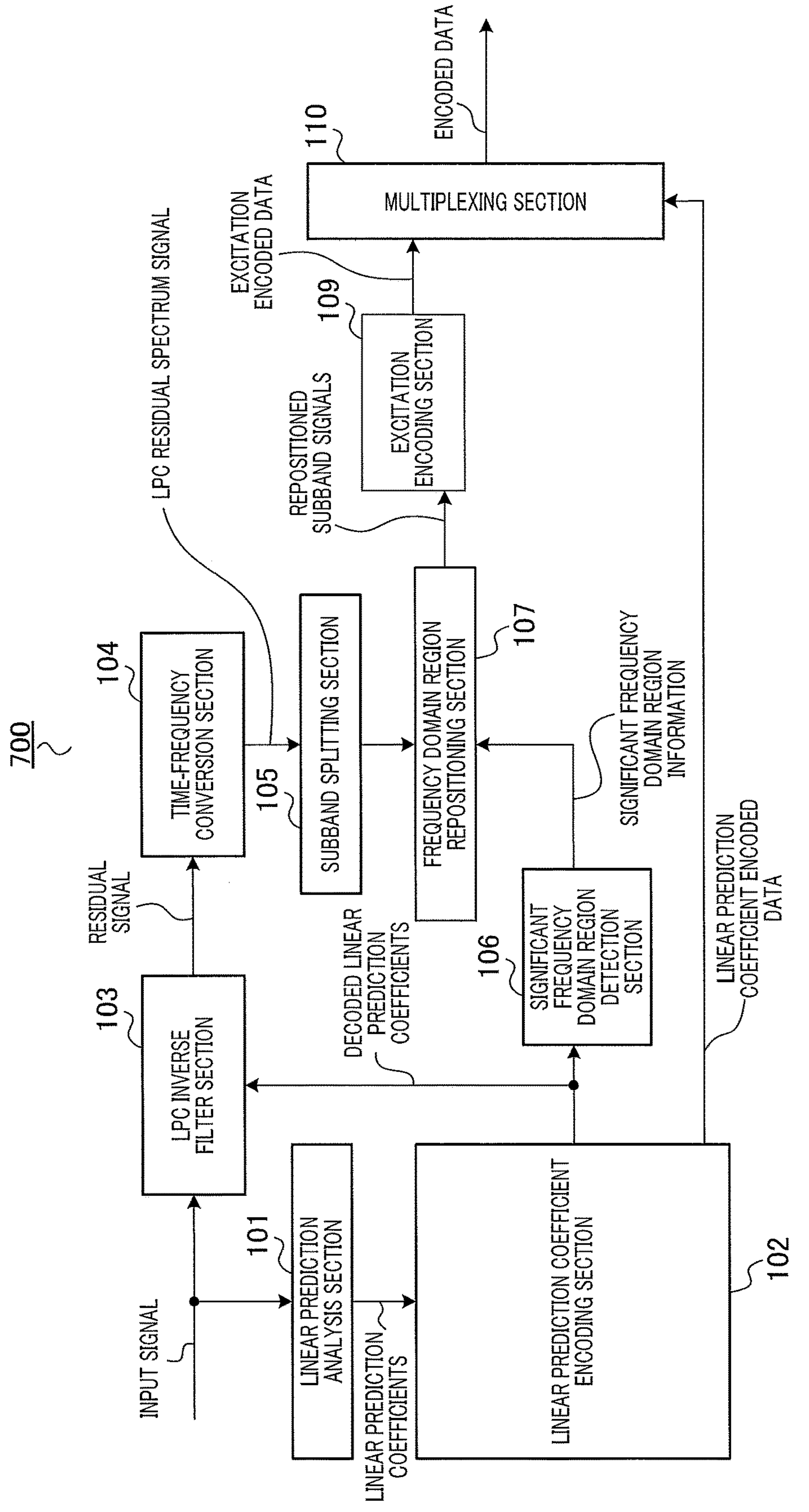
FIG. 7 is block diagram showing the configuration of a speech/audio encoding apparatus according to Embodiment 2 of the present invention.

FIG. 7 is a block diagram showing the configuration of speech/audio encoding apparatus 700 according to Embodiment 2 of the present invention.

Speech/audio encoding apparatus 700 shown in FIG. 7, in comparison with speech/audio encoding apparatus 100 according to Embodiment 1 shown in FIG. 1, eliminates bit allocation computation section 108. In FIG. 7, parts having the same configuration as those in FIG. 1 are assigned the same reference notations, and the descriptions thereof will be omitted.

Frequency domain region repositioning section 107 receives as input the LPC residual spectrum signal that has been split into subbands and outputted from subband splitting section 105, and the significant frequency domain region information outputted from significant frequency domain region detection section 106. Frequency domain region repositioning section 107, based on the significant frequency domain region information, rearranges the LPC residual spectrum signal split into subbands, and outputs these to excitation encoding section 109 as the repositioned subband signals. Specifically, frequency domain region repositioning section 107 repositions significant frequency domain regions detected by significant frequency domain region detection section 106 adjacently from the low-band end. In this case, because many bits are allocated to the low-band end, among the significant frequency domain regions, the lower the frequency domain region, the higher is the possibility of many bits being allocated at the time of encoding.

Excitation encoding section 109 receives as input repositioned subband signals outputted from frequency domain region repositioning section 107, encodes the repositioned subband signals using the bit allocations for each subband defined beforehand, and outputs the result as excitation encoded data to multiplexing section 110.

Multiplexing section 110 receives as input linear prediction coefficient encoded data outputted from linear prediction coefficient encoding section 102 and excitation encoded data outputted from excitation encoding section 109, and multiplexes and outputs these data as encoded data.

<Configuration of Speech/Audio Decoding Apparatus>

Figure 8:
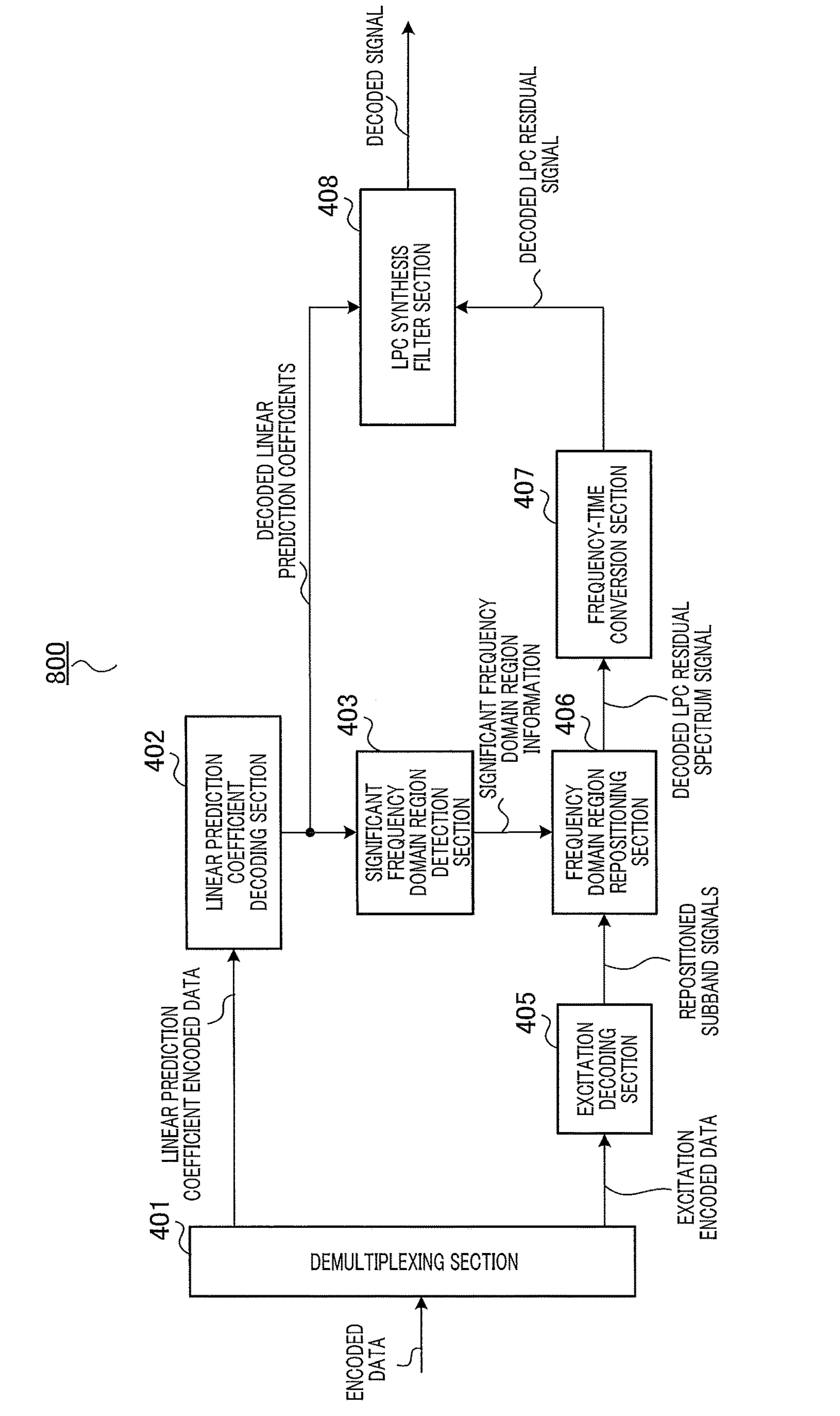
FIG. 8 is a block diagram showing the configuration of a speech/audio decoding apparatus according to Embodiment 2 of the present invention.

Speech/audio decoding apparatus 800 shown in FIG. 8, compared with speech/audio decoding apparatus 400 according to Embodiment 1 shown in FIG. 4, eliminates the bit allocation decoding section 404. In FIG. 8, parts having the same configuration as those in FIG. 4 are assigned the same reference notations, and the description thereof will be omitted.

Demultiplexing section 401 receives encoded data from speech/audio encoding apparatus 700, outputs linear prediction coefficient encoded data to linear prediction coefficient decoding section 402, and outputs excitation encoded data to excitation decoding section 405.

Excitation decoding section 405 receives as input the excitation encoded data outputted from demultiplexing section 401, defines the number of encoding bits for each subband in accordance with the bit allocation defined beforehand for each subband, uses that information to decode the excitation encoded data for each subband, and obtains the repositioned subband signals.

Effect of Embodiment 2

In this manner, according to the present embodiment, in addition to the effect of the above-noted Embodiment 1, audibly significant frequency components that are the subject of encoding only audibly significant frequency domain regions can be encoded with high accuracy, thereby enabling a subjective quality improvement.

Additionally, according to the present embodiment, even for a signal in which audibly significant energy is distributed of the low frequency band, it is possible to encode the spectral shape and gain of an excitation signal in a more detailed way, enabling a high-quality decoded signal.

According to the present embodiment, encoded bits assigned to bit allocation information can be used to encode the spectral shape and gain of the excitation.

Embodiment 3

In the present embodiment, the operation that differs from the above-noted Embodiment 1 and Embodiment 2 in frequency domain region repositioning section 107 will be described. The present embodiment provides improvement in the case in which, because the bit rate is low and encoding is possible for only a part of the subbands, there is only a limited bit allocation to each subband. The example in which the subband width is fixed and the encoding bits to be allocated to each subband are defined beforehand will be described.

In the present embodiment, because the speech/audio encoding apparatus has the same configuration as in FIG. 1, and the speech/audio decoding apparatus has the same configuration as in FIG. 4, the descriptions thereof will be omitted.

Figure 9:
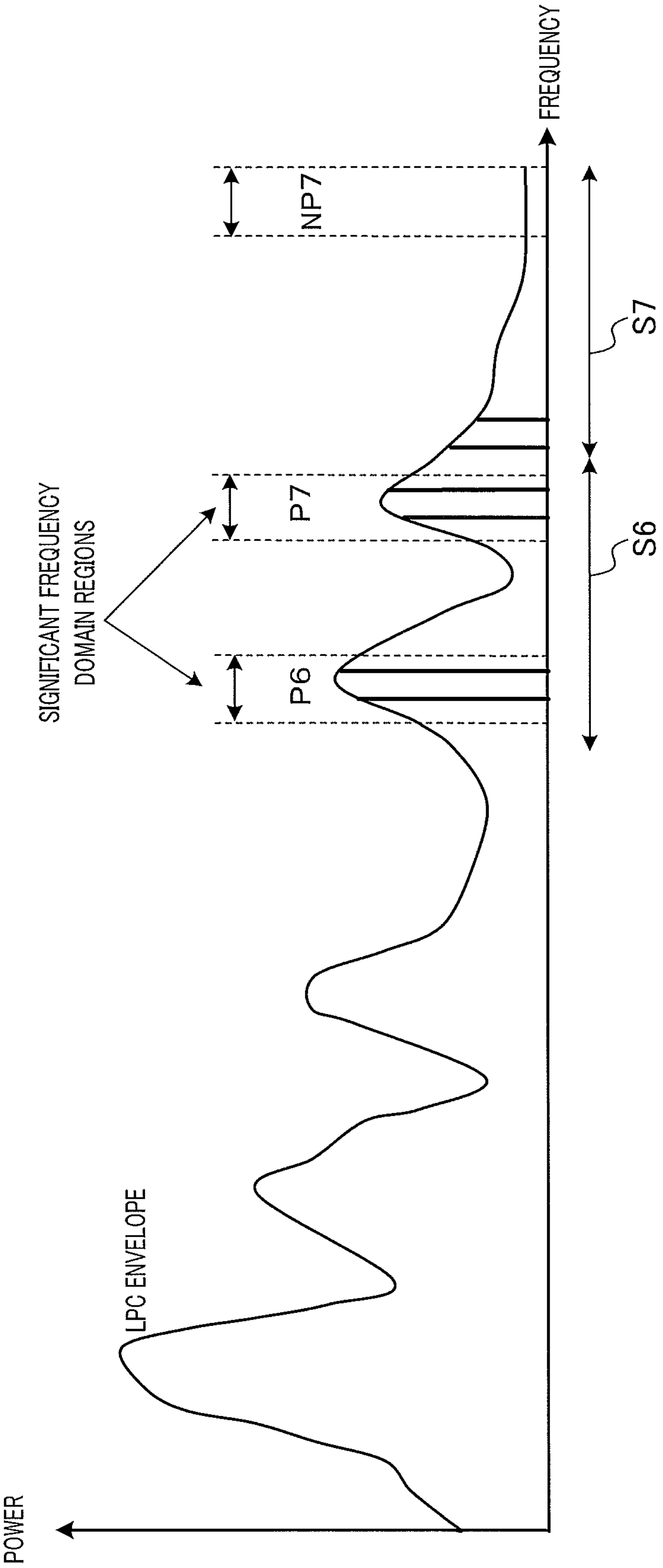
FIG. 9 is a drawing showing the problem in the related art's method.

FIG. 9 is a drawing showing the problem with the conventional method. In FIG. 9, the horizontal axis represents frequency and the vertical axis represents spectral power, the thin black line showing the LPC envelope.

S6 and S7 are shown as high-band end subbands. Let us assume that encoding bits are allocated to S6 and S7 to represent only two spectra. Let us assume that significant frequency domain regions P6 and P7 are detected in S6 and no significant frequency domain region is detected in S7, and that the frequencies having a large power in S7 are the two lowest frequencies therein. In the powers of the frequencies of P6 and P7 detected in S6, let us assume that the powers of the two frequencies within P6 are larger than the largest frequency power within P7.

In the above-noted case, with the conventional method, the two spectra of P6 in S6 are encoded, and the spectra of P7 are not encoded. In S7, the two spectra at the lowest end are encoded. In this manner, in the case in which there is a plurality of significant frequency domain regions within a subband, which is a unit for encoding, there is the possibility of not being able to encode sufficiently.

To solve the above problem, frequency domain region repositioning section 107 performs repositioning so that there are only a prescribed number of significant frequency domain regions within a subband, which is the unit for encoding. Frequency domain region repositioning section 107 calculates, from the number of bits that can be used for encoding, the number of frequencies that can be represented and, if a judgment is made that, because of a plurality of significant frequency domain regions, sufficient representation is not possible, moves significant frequency domain regions on the high-band end to subbands that are further on the high-band end. The procedure is indicated below.

First, the number of significant frequency domain regions that can be encoded is calculated from the number of allocated bits of the subband S(n), where S indicates the spectrum split into subbands, and n indicates the subband number that is incremented from the low-band end.

Next, let us assume that Sp(n) significant frequency domain regions are detected in the subband S(n).

When this occurs, if Sp(n)≤Spp(n), S(n) is encoded. Where, Spp(n) indicates the number of significant frequency domain regions that can be encoded in the subband S(n).

If, however, Sp(n)>Spp(n), frequency domain region repositioning section 107 repositions the significant frequency domain regions.

Specifically, frequency domain region repositioning section 107 repositions a number, that is Sp(n) minus Spp(n), of significant frequency domain regions to the subband S(n+1). When this is done, frequency domain region repositioning section 107 exchanges with a frequency domain region having a smallest energy in the same width as the significant frequency domain region to be repositioned to S(n+1). As a simplification, exchange may be made with the highest frequency domain region in S(n).

In this manner, the repositioned subband signals are encoded after repositioning the significant frequency domain regions. The above-noted processing is repeated until a subband is found in which a significant frequency domain region is detected.

Figure 10A:
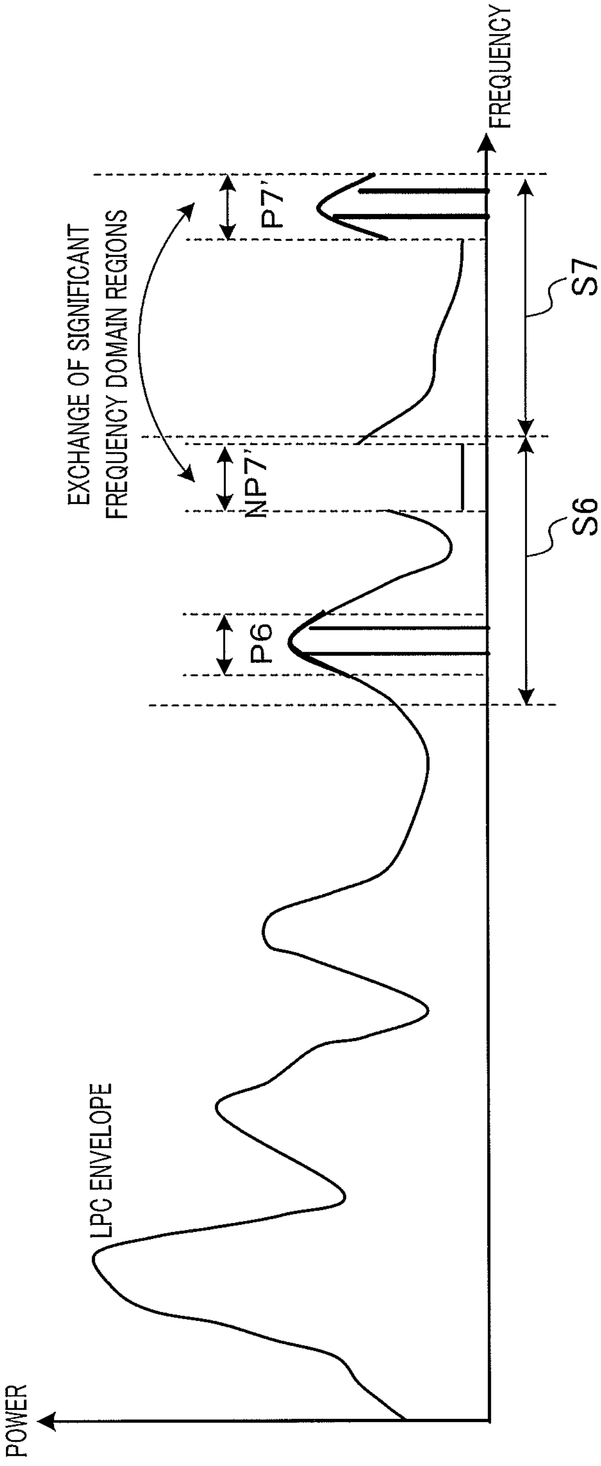
FIG. 10A is a drawing showing how the encoding after the repositioning is performed in Embodiment 3 of the present invention.
Figure 10B:
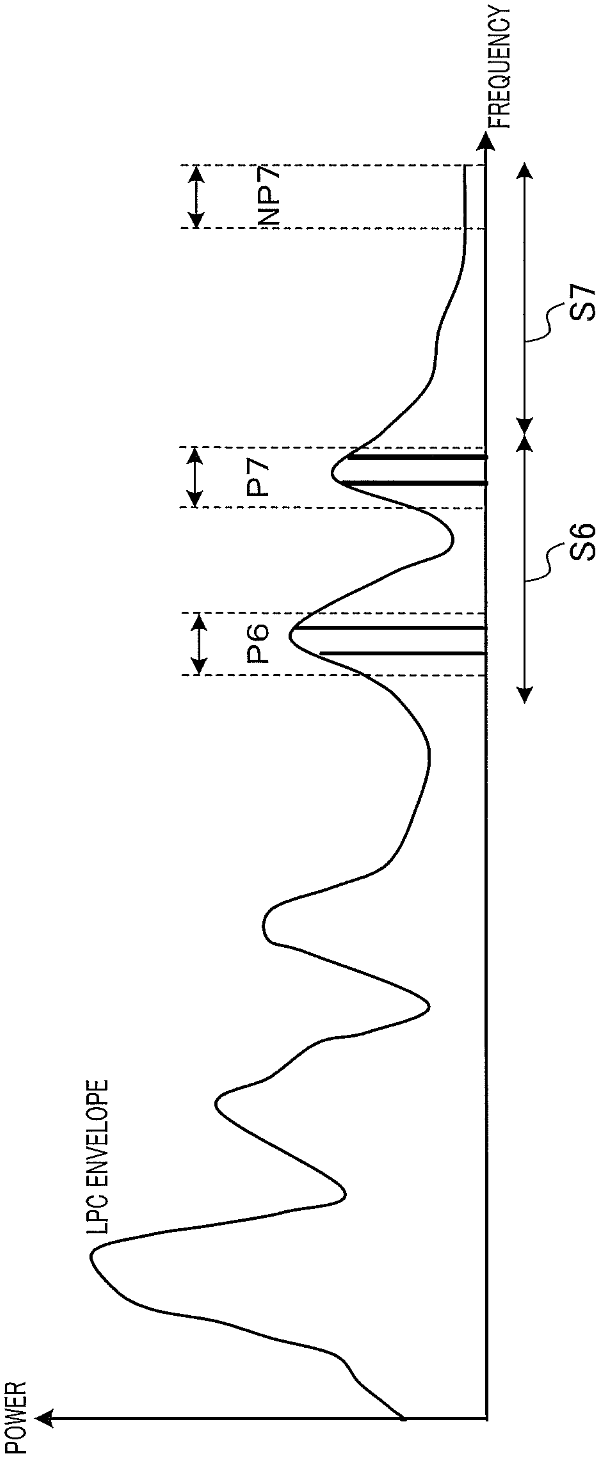
FIG. 10B is a drawing showing the decoding result of the repositioning processing in a speech/audio decoding apparatus according to Embodiment 3 of the present invention.

FIG. 10A is a drawing showing how encoding after the repositioning is performed. FIG. 10B is a drawing showing the results of decoding in the repositioning processing in the speech/audio decoding apparatus.

As described above, the two significant frequency domain regions P6 and P7 are detected in S6, and no significant frequency domain region is detected in S7. In the present embodiment, because P7 is on the high-frequency side of P6, it will be repositioned to S7. In S7, because the NP7 frequency domain region is the frequency domain region with the lowest energy, the slots of NP7 and P7 are exchanged. P7 is repositioned to the NP7 frequency domain region in S7 and becomes P7'. NP7 in S7 moves to S6 and becomes NP7'. As a result, since there is only one significant frequency domain region in S6 after repositioning, P6 is encoded. Next, the processing to reposition S7 is performed. Because only P7' which hasa been repositioned from S6 exists as a significant frequency domain region in S7, P7' is encoded.

The positioning in FIG. 10B is achieved by returning the positions of NP7' and P7' in FIG. 10A based on the significant frequency domain region information. Thus, by performing repositioning processing, it is possible to encode P6 and P7, which are significant frequency domain regions.

By the above operation, even if there are a plurality of significant frequency domain regions within one subband, preventing sufficient encoding, repositioning the significant frequency domain regions makes it possible to encode more significant frequency domain regions.

In this manner, in the present embodiment, even in the case in which there is only a limited bit allocation to each subband, because the bit rate is low and encoding is possible for only a part of the subbands, the target signal is repositioned so that the number of significant frequency domain regions in one subband is made equal to or below a given number. By doing this, according to the present embodiment, in addition to the effect of the above-noted Embodiment 1, the selection of audibly significant frequency components for encoding is facilitated, and a subjective quality improvement is possible.

Variation of Embodiment 3

In the present variation, in a case in which there are a plurality of significant frequency domain regions in a given subband and it is calculated that sufficient encoding is not possible, significant frequency domain regions in the high-band end are repositioned to subbands that are further on the high-band end, the present invention is not restricted to this and may reposition significant frequency domain regions having a low amount energy to subbands that are further on the high-band end. Under the same conditions, significant frequency domain regions on the low-band end or significant frequency domain regions having a large amount of energy may be repositioned to subbands on the low-band end. Repositioned subbands need not be adjacent to one another.

Variation Common to Embodiment 1 to Embodiment 3

Although in the above-described Embodiment 1 to Embodiment 3, the significant frequency domain regions were treated as having the same significance, the present invention is not restricted to this and weighting may be applied to the significant frequency domain regions. For example, the most significant frequency domain regions may be, as shown in Embodiment 1, grouped at the low-band end, and the next significant frequency domain regions may be, as shown in Embodiment 3, repositioned so that one significant frequency domain region is included in one subband. The degree of significance may be calculated by the input signal or the LPC envelope, or may be calculated by the energy of the slots of the excitation spectrum signal. For example, a significant frequency domain region lower than 4 kHz may be made the most significant frequency domain region, with significant frequency domain regions of 4 kHz and above being made to have a lower significance.

Also, although in the above-noted Embodiment 1 to Embodiment 3 a frequency domain region which has larger spectrum than the moving average of the LPC envelope was detected as a significant frequency domain region, the present invention is not restricted to this and the difference between the LPC envelope and its moving average may be used to determine the width or the significance of a significant frequency domain region. For example, determination may be done so that a significant frequency domain region having a small difference between the LPC envelope and its moving average has its significance one step lowered or its width is made narrow.

Although in the above-noted Embodiment 1 to Embodiment 3, the LPC envelope was determined using the linear prediction coefficients and the significant frequency domain regions were calculated by the energy distribution thereof, the present invention is not restricted to this and, because there is a tendency in the LSP or ISP that the shorter is the distance between nearby coefficients, the larger is the energy of a frequency domain region, determination may be done directly by taking a frequency domain region having a short distance between coefficients to be a significant frequency domain region.

Although the above-noted embodiments have been described by examples of hardware implementations, the present invention can also be implemented by software in conjunction with hardware.

The functional blocks used in the descriptions of the above-noted embodiments are typically implemented by LSI devices, which are integrated circuits. These may be individually implemented as single chips and, alternatively, a part or all thereof may be implemented as a single chip. The term LSI devices as used herein, depending upon the level of integration, may refer variously to ICs, system LSI devices, very large-scale integrated devices, and ultra-LSI devices.

The method of integrated circuit implementation is not restricted to LSI devices, and implementation may be done by dedicated circuitry or a general-purpose processor. After fabrication of an LSI device, a programmable FPGA (field-programmable gate array) or a re-configurable processor that enables reconfiguration of connections of circuit cells within the LSI device or settings thereof may be used.

Additionally, in the event of the appearance of technology for integrated circuit implementation that replaces LSI technology by advancements in semiconductor technology or technologies derivative therefrom, that technology may of course be used to integrate the functional blocks. Another possibility is the application of biotechnology or the like.

The disclosure of Japanese Patent Application No. 2011-94446, filed on Apr. 20, 2011, including the specification, drawings and abstract is incorporated herein by reference in its entirety.

INDUSTRIAL APPLICABILITY

The present invention is useful as a encoding apparatus and a decoding apparatus performing encoding and decoding of a speech signal and/or a music signal.

REFERENCE NOTATIONS LIST

100 Speech/audio encoding apparatus
101 Linear prediction analysis section
102 Linear prediction coefficient encoding section
103 LPC inverse filter section
104 Time-frequency conversion section
105 Subband splitting section
106 Significant frequency domain region detection section
107 Frequency domain region repositioning section
108 Bit allocation computation section
109 Excitation encoding section
110 Multiplexing section

The invention claimed is:

1. A speech/audio encoding device comprising:
a receiver that receives a time-domain speech/audio input signal;
a memory; and
a processor that
transforms the speech/audio input signal into a frequency domain;
quantizes energy envelopes which represent an energy level for a frequency spectrum of the speech/audio input signal;
groups quantized energy envelopes into a plurality of groups based on similarity of frequencies, such that quantized energy envelopes having frequencies of significance are positioned adjacent to one another, and quantized energy envelopes having frequencies of non-significance are positioned adjacent to one another;
determines a perceptually significant group and a perceptually non-significant group, the perceptually significant group including one or more significant bands, each perceptually significant group including a local-peak frequency, and the perceptually non-significant group being a group other than the perceptually significant group;
allocates bits to a plurality of subbands corresponding to the grouped quantized energy envelopes; and
encodes a spectrum included in a subband using the bits allocated to the subbands in a subband-by-subband basis,
wherein more bits are allocated to subbands corresponding to the perceptually significant group than the perceptually non-significant group.

2. The speech/audio encoding device according to claim 1, wherein the perceptually significant group includes the one or more significant bands and a local-peak frequency, and both sides of the local-peak frequency form a descending slope.

3. The speech/audio encoding device according to claim 1, wherein each of the one or more significant bands is defined independently from the plurality of subbands obtained by splitting the frequency spectrum of the speech/audio input signal.

4. A speech/audio encoding method comprising:
receiving, by a receiver, a time-domain speech/audio input signal;
transforming, by a processor, the speech/audio input signal into a frequency domain;

quantizing, by the processor, energy envelopes which represent an energy level for a frequency spectrum of the speech/audio input signal;

grouping, by the processor, quantized energy envelopes into a plurality of groups based on similarity of frequencies, such that quantized energy envelopes having frequencies of significance are positioned adjacent to one another, and quantized energy envelopes having frequencies of non-significance are positioned adjacent to one another;

determining, by the processor, a perceptually significant group and a perceptually non-significant group, the perceptually significant group including one or more significant bands, each perceptually significant group including a local-peak frequency, and the perceptually non-significant group being a group other than the perceptually significant group;

allocating, by the processor, bits to a plurality of subbands corresponding to the grouped quantized energy envelopes; and encoding, by the processor, a spectrum included in a subband using the bits allocated to the subbands in a subband-by-subband basis wherein more bits are allocated to subbands corresponding to the perceptually significant group than the perceptually non-significant group.

5. The speech/audio encoding method according to claim 4, wherein the perceptually significant group includes the one or more significant bands and a local-peak frequency, and both sides of the local-peak frequency form a descending slope.

6. The speech/audio encoding method according to claim 4, wherein each of the one or more significant bands is defined independently from the plurality of subbands obtained by splitting the frequency spectrum of the speech/audio input signal.

* * * * *